Jan. 21, 1958  F. J. SCHENKELBERGER  2,820,562
INDUSTRIAL TRUCK
Filed April 21, 1955  4 Sheets-Sheet 1
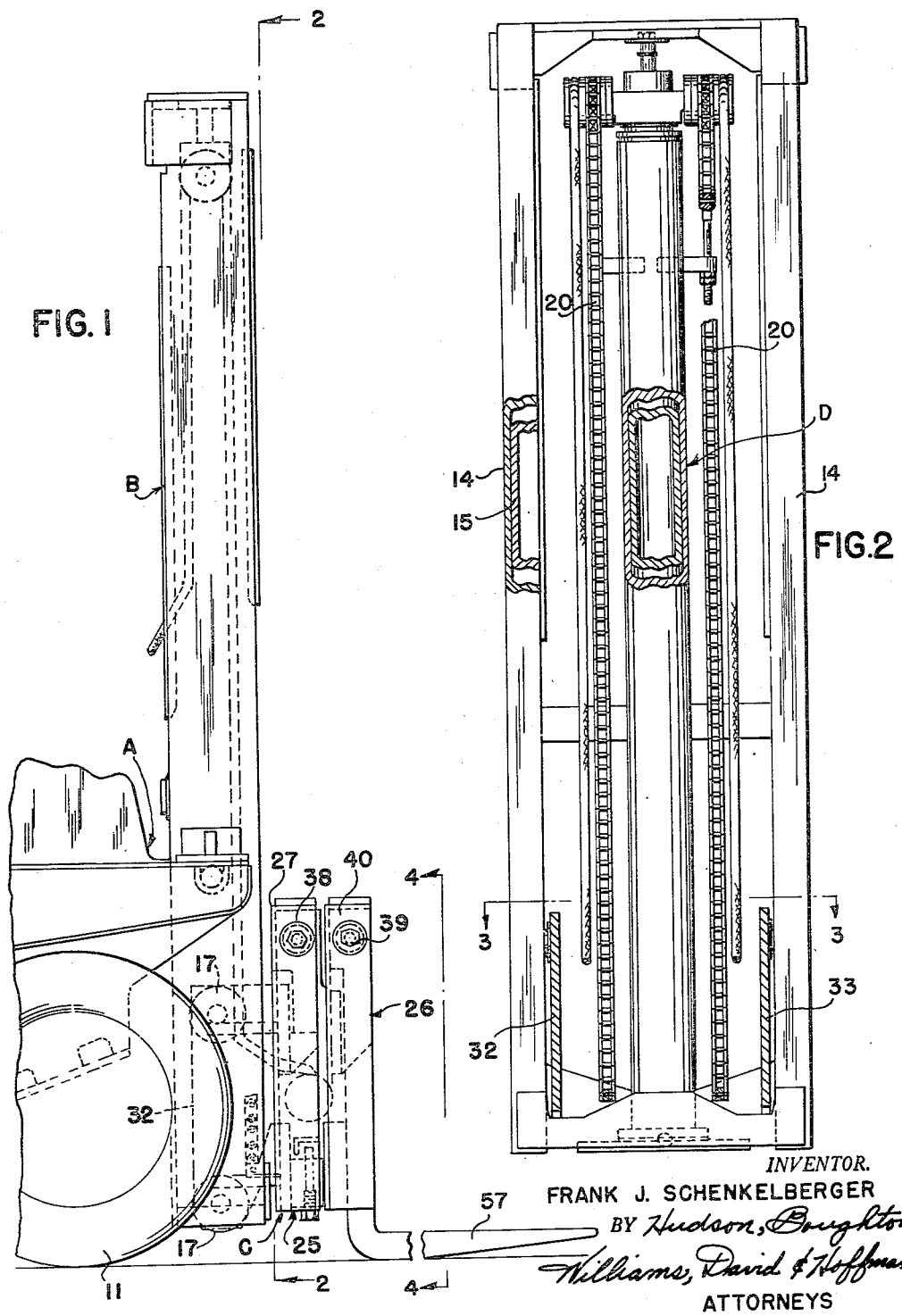
INVENTOR.
FRANK J. SCHENKELBERGER
BY Hudson, Boughton,
Williams, David & Hoffmann
ATTORNEYS Jan. 21, 1958     F. J. SCHENKELBERGER     2,820,562
INDUSTRIAL TRUCK Filed April 21, 1955     4 Sheets-Sheet 2

INVENTOR.
FRANK J. SCHENKELBERGER
ATTORNEYS

Jan. 21, 1958  F. J. SCHENKELBERGER  2,820,562
INDUSTRIAL TRUCK

Filed April 21, 1955  4 Sheets-Sheet 3

INVENTOR.
FRANK J. SCHENKELBERGER
BY Hudson, Boughton,
Williams, David & Hoffmann
ATTORNEYS Jan. 21, 1958  F. J. SCHENKELBERGER  2,820,562
INDUSTRIAL TRUCK Filed April 21, 1955  4 Sheets-Sheet 4

INVENTOR.
FRANK J. SCHENKELBERGER
BY Hudson, Boughton,
Williams, David & Hoffmann
ATTORNEYS United States Patent Office 2,820,562
Patented Jan. 21, 1958

2,820,562

INDUSTRIAL TRUCK

Frank J. Schenkelberger, North Olmsted, Ohio, assignor to The Baker-Raulang Company, Cleveland, Ohio, a corporation of Delaware Application April 21, 1955, Serial No. 502,817

3 Claims. (Cl. 214—730)

The present invention relates to material handling apparatus and, more particularly, to an industrial lift truck having a load carrier supported for sideways movement by an elevatable load carriage.

An object of the present invention is the provision of a new and improved material handling apparatus, particularly an industrial lift truck, having an elevatable carriage, a load carrier frame supported by the carriage and shiftable sideways with respect to the carriage and adapted to adjustably support a load engaging member and/or to mount other conventional load engaging attachments, the load carrier frame being removably supported by a framework of the carriage adapted to function as a conventional, non-shiftable load carrier frame upon the removal of the shiftable load carrier frame.

Another object of the present invention is the provision of a new and improved attachment for industrial lift trucks which is so constructed and arranged that a truck with a conventional load carrier frame which is not shiftable sideways may be readily converted to a truck with a side shifting load carrier, the shiftable load carrier being adapted to adjustably support a fork type load engaging member and/or to mount similar load engaging attachments for industrial trucks.

The invention resides in certain constructions and combinations and arrangements of parts, and other objects and advantages thereof will be apparent to those skilled in the art to which the invention relates from the following description of the preferred embodiment described with reference to the accompanying drawings forming a part of this specification, in which:

Fig. 1 is a fragmentary side elevational view of the front end of an industrial lift truck embodying the present invention;

Fig. 2 is a view taken approximately along line 2—2 of Fig. 1 and having portions broken away to better show the construction;

Figure 3:
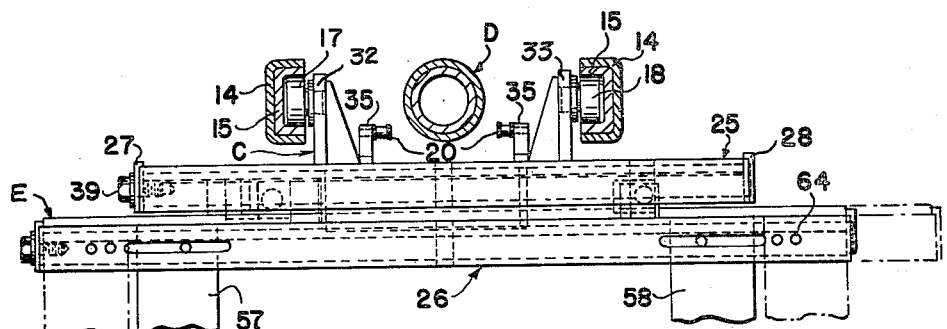
Fig. 3 is a view taken approximately along line 3—3 of Fig. 2.

Although the present invention is susceptible of various modifications and of use with various types of material handling apparatus, it is herein shown and described as embodied in an industrial lift truck having an elevatable carriage supported on the front end thereof.

Referring to the drawings, the industrial lift truck shown comprises a chassis A supported on front and rear wheels 11, only one wheel appearing in the drawing. The front wheels are preferably driven by suitable means, such as an electric motor, and the rear wheels are preferably dirigibly connected to the chassis so as to be directable by a steering wheel supported on the chassis adjacent to the operator's position.

The chassis A has a vertically extending mast assembly B mounted on the front end thereof for limited tilting movement about a horizontal axis upon the operation of a suitable hydraulic cylinder, not shown in the drawing. The mast assembly B is of conventional construction and will not, therefore, be described in detail. Suffice it to say that the assembly comprises, in the illustrated embodiment, upright, laterally spaced primary guides 14 of channel shape, secondary guides 15, also channel shaped, and adapted to telescope respectively into the primary guides 14, an elevatable carriage C movable vertically with respect to the guides and having pairs of rollers 17, 18 adapted to operate in the channels of the secondary guides, and a vertical hydraulic cylinder assembly D operable to raise and lower the elevatable carriage C relative to the secondary guides through chains 20 connected to a movable member of the cylinder assembly. After a predetermined elevational movement of the carriage relative to the secondary guide, the cylinder assembly also operates to raise the secondary guides with the carriage relative to the primary guides. Since the mast assembly, per se, for supporting and elevating the load carriage C forms no part of the present invention, it may be of any suitable conventional or other construction and it is to be understood that other elevating means may be substituted for that shown.

The carriage C, in addition to the rollers 17 and 18 already mentioned, includes a generally vertically extending frame structure or framework 25 comprising spaced vertical end plates 27, 28 joined by upper and lower horizontal frame members 30, 31 respectively. The horizontal frame members 30, 31 are plate-like members which lie in a vertical plane and have fixed to the rear sides thereof spaced, vertical roller support plates 32, 33 for supporting the rollers 17, 18 respectively. The roller support plates 32, 33 are reinforced by webs 34 extending between the plates and the lower frame member 31. The chains 20 for raising and lowering the load carriage are connected to brackets 35, also secured to the rear face of the lower horizontal frame member 31 of the carriage.

The framework 25 includes a bar 36 removably supported between the end plates 27, 28 and above the upper horizontal frame member 30. The bar 36 preferably has a circular cross section, as shown, and a reduced portion 37 at one end thereof adapted to be received by an aperture in the end plate 32 and forming a shoulder to limit movement of the bar 36 toward the end plate 27. Movement of the bar 36 in the other direction is prevented by a washer 38 and a bolt 39 threaded axially into the reduced portion 37. The washer clamps against the outer side of end plate 27 to securely hold the bar 36 against axial movement. The bar 36 is adapted to removably support conventional or other load engaging members when the truck is to be used in applications where a side-shifting load carrier is not required.

In accordance with the illustrated and preferred embodiment of the present invention, however, a load carrier 26 including a load carrier frame E is removably supported from the bar 36 for movement therealong. The load carrier frame E comprises spaced, vertically extending end plates 40, 41 connected together by upper and horizontal plate-like members 42, 43, the members 42, 43 lying in a vertical plane. A pair of support arms 44, 45 are welded or otherwise fixed to the rear side of the upper plate-like member 42 and extend rearwardly and upwardly therefrom. The upper portion of each of the arms 44, 45 has an opening 46 therethrough which receives and passes the bar 36 of the framework 25 of the carriage C. The construction of the openings 46 and the bar 36 is such that the arms 44, 45 may be moved along the bar 36 to shift the load carrier frame E sideways with respect to the carriage.

The lower rear portion of the load carrier frame E, i. e., the rear side of the plate-like member 43, bears against spaced bearing blocks 47, 48 secured to the face of the lower horizontal frame member of the framework 25. The blocks 47, 48 are each provided with a facing 50 of relatively soft material which functions as a wear surface. Movement of the lower portion of the load carrier frame E away from the bearing blocks 47, 48 is limited by angle members 51, 52 secured to the rear face of the plate-like member 43 above the bearing blocks 47, 48, respectively. The angle members 51, 52 are L-shaped and have one leg 53 which extends rearwardly from the plate-like member 43 and a second leg 54 extending downwardly from the leg 53 parallel to the plate-like member 43. The movement of the load carrier frame E away from the bearing blocks 47, 48 is limited by the engagement of the legs 54 with pins 55 supported by the bearing blocks. The pins 55 are threaded into the underside of the bearing blocks 47, 48 and extend therethrough and project above the bearing block to a position where the end portion of each pin will be engaged by one of the legs 54.

The load carrier frame E is provided wtih a generally horizontal bar 56 which is removably supported between the vertical end plates 40, 41 above the horizontal plate-like member 42 in a manner similar to the described support bar 36. The bar 56 is shown in the illustrated embodiment as supporting a pair of load engaging or fork members 57, 58 each having an aperture 60 in the upper end thereof to receive and pass the bar 56. The illustrated fork members 57, 58 are similar to conventional fork members and, therefore, will not be described in detail. Suffice it to say that the fork members are held in their desired position with respect to the bar 56 by means of an individual U-shaped bracket 61 for each of the fork members 57, 58. Each U-shaped bracket 61 has depending legs 62, 63 each adapted to pass through one of a plurality of apertures 64 in a frame member 65 joining the upper ends of the vertical end plates 27, 28 above the bar 56. The legs 62, 63 of the bracket extend through the apertures 64 to straddle the fork member being positioned thereby and prevent its lateral movement with respect to the load carrier frame. A plurality of apertures 64 is provided in the frame member 65 so that the position of the fork members may be readily adjusted as shown in Fig. 3.

Figure 4:
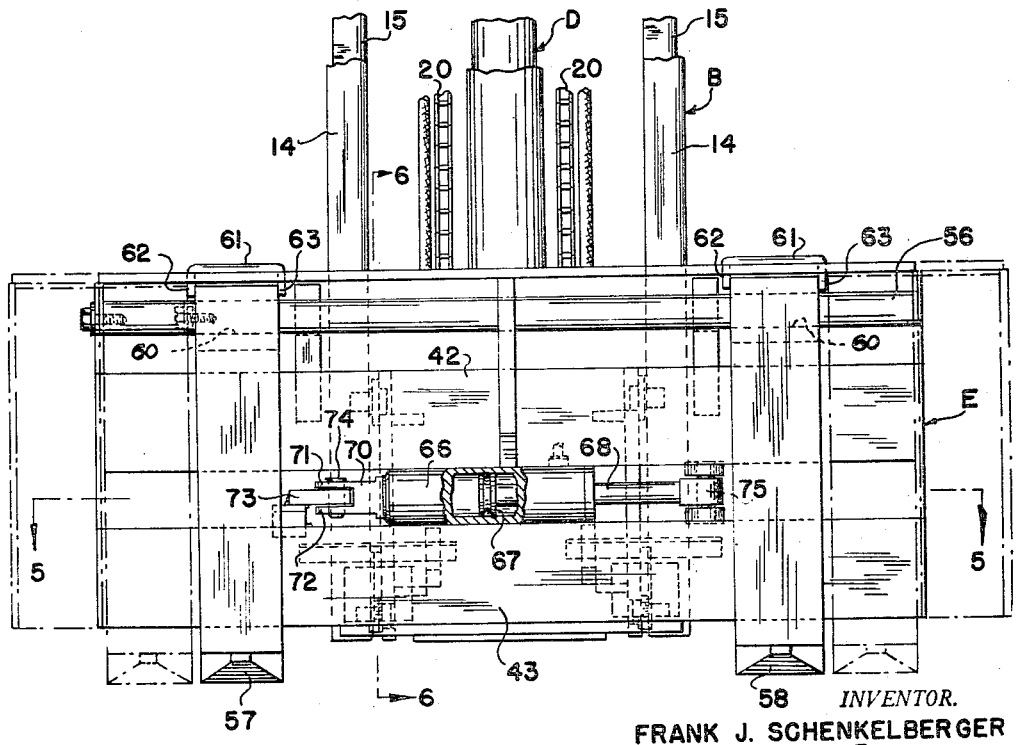
Fig. 4 is a fragmentary elevational view taken approximately along line 4—4 of Fig. 1.
Figure 5:
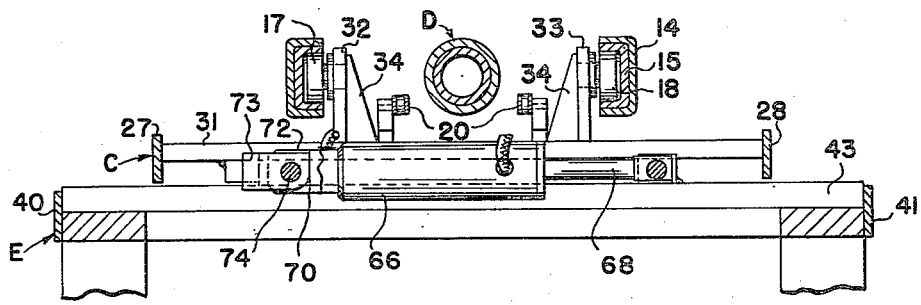
Fig. 5 is a sectional view taken approximately along line 5—5 of Fig. 4.
Figure 6:
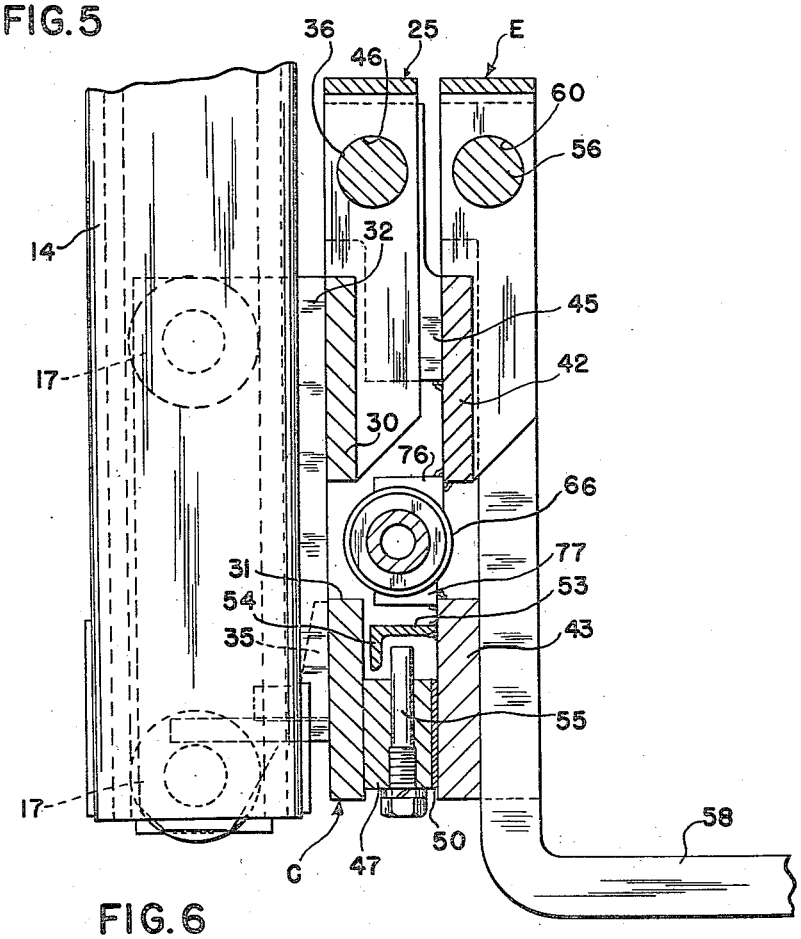
Fig. 6 is a sectional view taken approximately along line 6—6 of Fig. 4.
Figure 7:
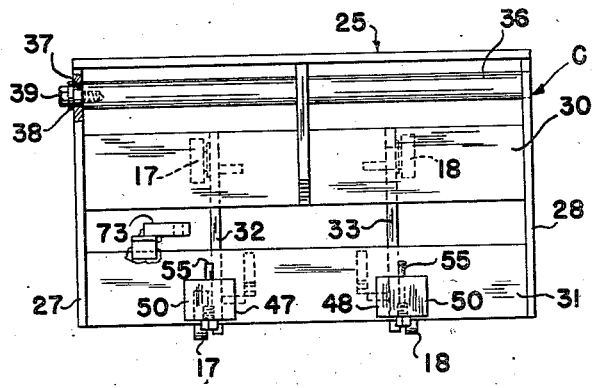
Fig. 7 is a detached front elevational view of the load carriage of the truck of Fig. 1.
Figure 9:
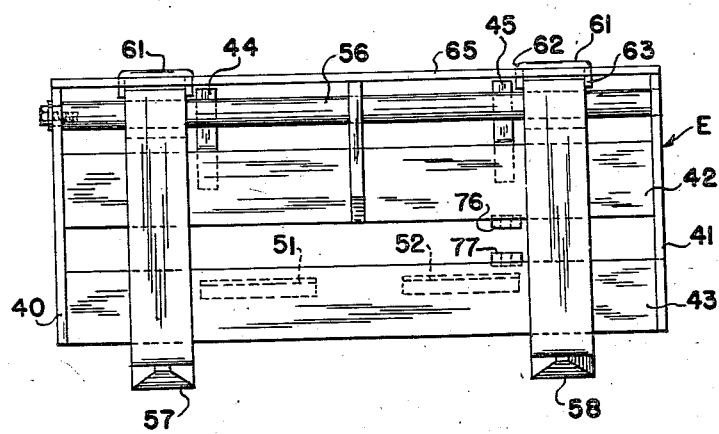
Fig. 9 is a detached front elevational view of the load carrier of the truck illustrated in Fig. 1.
Figures 8, 10:
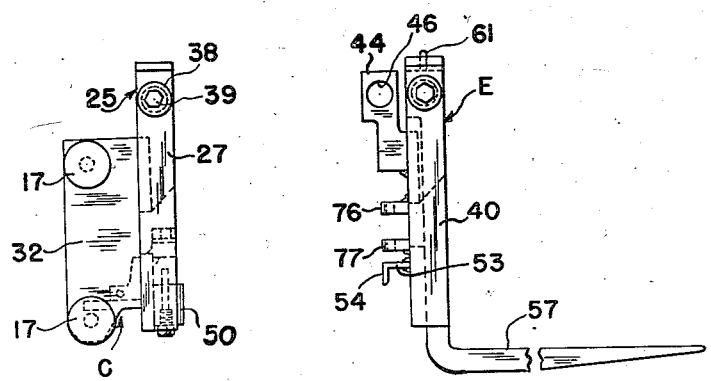
Fig. 8 is a side elevational view of the load carriage of Fig. 7.
Fig. 10 is a side elevational view of the load carrier of Fig. 9.

The load carrier frame E is preferably shiftable with respect to the load carriage C by suitable power actuated means. In the illustrated embodiment a hydraulic cylinder 66 having a cooperating piston 67 and piston rod 68 is connected between the framework 25 and the load carrier frame E. The cylinder 66 is connected to the carriage C by a bifurcated bracket 70 fixed to the left-hand end of the cylinder as it is viewed in Fig. 4. The bracket 70 has arms 71, 72 which straddle a first member 73 welded or otherwise connected to the upper edge of the lower horizontal frame member 31 of the framework 25. A pin 74 passes through the bifurcated arms 71, 72 to connect the bracket to the plate 73.

The piston rod 68 is connected to the load carrier frame E by a pin 75 which passes through the outer end of the piston rod and which is removably supported between spaced plates 76, 77 fixed to the adjacent edges of the plate-like members 42, 43, respectively. The hydraulic cylinder 66 is preferably a double-acting cylinder and the piston 67 thereof is preferably positioned in approximately the mid-point of the length of the cylinder when the load carrier frame E is centrally positioned with respect to the framework 25 of the carriage C. The load carrier frame may then be shifted in either direction, depending upon which side of the piston 67 is subjected to fluid pressure.

The pins and brackets for connecting the cylinder 66 and the piston rod 68 to the framework 25 and the load carrier frame E, respectively, are, in the illustrated embodiment, constructed so that the hydraulic cylinder may be readily disconnected from both the elevatable carriage and the load carrier frame. This enables the load carrier frame E to be removed, the hydraulic cylinder 66 and cooperating piston to be disconnected, and the elevatable carriage C used in the manner of a conventional non-shifting load carrier.

As hereinbefore mentioned, when the load carrier frame E is removed, conventional or other attachments for engaging and handling various types of loads may be connected to the elevatable carriage by connecting them to the bar 36 in the same manner as the load carrier frame E is normally supported from the bar 36. The above-described arrangement provides an industrial truck which is extremely flexible and which will meet the majority of the needs of most users.

From the foregoing, it will be apparent that the objects of the invention heretofore enumerated and others have been accomplished and that there has been provided a novel and improved industrial lift truck having an elevatable carriage including a framework for supporting a load carrier frame for generally horizontal movement, the carrier frame including a member for adjustably supporting a load engaging member, and the load carriage and the load carrier frame being so constructed that upon removal of the load carrier frame the load carriage is adapted to function as a conventional nonshifting load carrier. While the carriage C and the load carrier frame E are illustrated as preferably comprising horizontal bars for removably supporting either the load carrier frame or load engaging member, as the case might be, it is to be understood that other types of supporting means adapted to perform the functions of the bars 36, 56 may be substituted therefor. Preferably, however, the supporting means which are substituted for the bars 36, 56 are substantially duplicates of each other so that the same load engaging members may be connected to either the carriage C or the load carrier frame E.

While the preferred embodiment of the invention has been described with considerable detail, the invention is not limited to the particular construction shown, and it is my intention to cover hereby all adaptations, modifications and uses thereof which come within the practice of those skilled in the art to which the invention relates and the scope of the appended claims.

Having thus described my invention, I claim:

1. In an industrial lift truck, a chassis, a carriage including a frame structure having spaced generally vertical plates and a first generally horizontal bar-like member removably supported between the spaced plates, means supporting said carriage on said chassis for elevational movement with respect thereto, means for elevating said carriage, a load carrier frame including generally vertically spaced plates and a second generally horizontal bar-like member removably supported between the last-mentioned plates, means connecting said load carrier frame to said first generally horizontal bar-like member for movement therealong, a load engaging member, means adjustably and removably connecting said load engaging member to said second bar-like member, and double-acting power actuated means connected between said carriage and said load carrier frame for shifting the load carrier frame with respect to the carriage.

2. In an industrial lift truck, a chassis, a carriage including a frame structure having spaced generally vertical plates and a first generally horizontal bar-like member removably supported between the spaced plates, means supporting said carriage on said chassis for elevational movement with respect thereto, means for elevating said carriage, a load carrier frame including generally vertically spaced plates and a second generally horizontal bar-like member removably supported between the last-mentioned plates, means connecting said load carrier frame to said first generally horizontal bar-like member for movement therealong, a load engaging member, means adjustably and removably connecting said load engaging member to said second bar-like member, double-acting hydraulic power means including cylinder and piston elements, means detachably connecting one of said elements to the carriage, and means detachably connecting the other of said elements to the load carrier frame.

3. In an industrial truck, an elevatable carriage comprising a generally vertically extending frame, the upper portion of said frame including a first substantially horizontal bar member, a load carrier comprising a generally vertically extending frame having a vertical dimension approximately coextensive with the first-mentioned frame, the upper portion of said frame of said load carrier including a second substantially horizontal bar member, means on the frame of said load carrier engaging said first bar member and removably supporting the frame of the load carrier for movement along the first bar member, load-engaging means, means detachably connecting said load-engaging means to said second substantially horizontal bar member, and double-acting power means for shifting the load on said load carrier with respect to said elevatable carriage comprising a cylinder element and a cooperating piston element and means detachably connecting one of said elements to the frame of said load carrier and the other of said elements to the frame of said carriage.

References Cited in the file of this patent

UNITED STATES PATENTS

| | | |
|---|---|---|
| 2,650,732 | Hartquist | Sept. 1, 1953 |
| 2,663,443 | Schenkelberger | Dec. 22, 1953 |
| 2,675,139 | Mercier et al. | Apr. 13, 1954 |
| 2,709,018 | Schenkelberger | May 24, 1955 |